March 1, 1932.     C. L. MOORMAN     1,847,354
SHOCK ABSORBER
Filed April 20, 1928     2 Sheets-Sheet 1
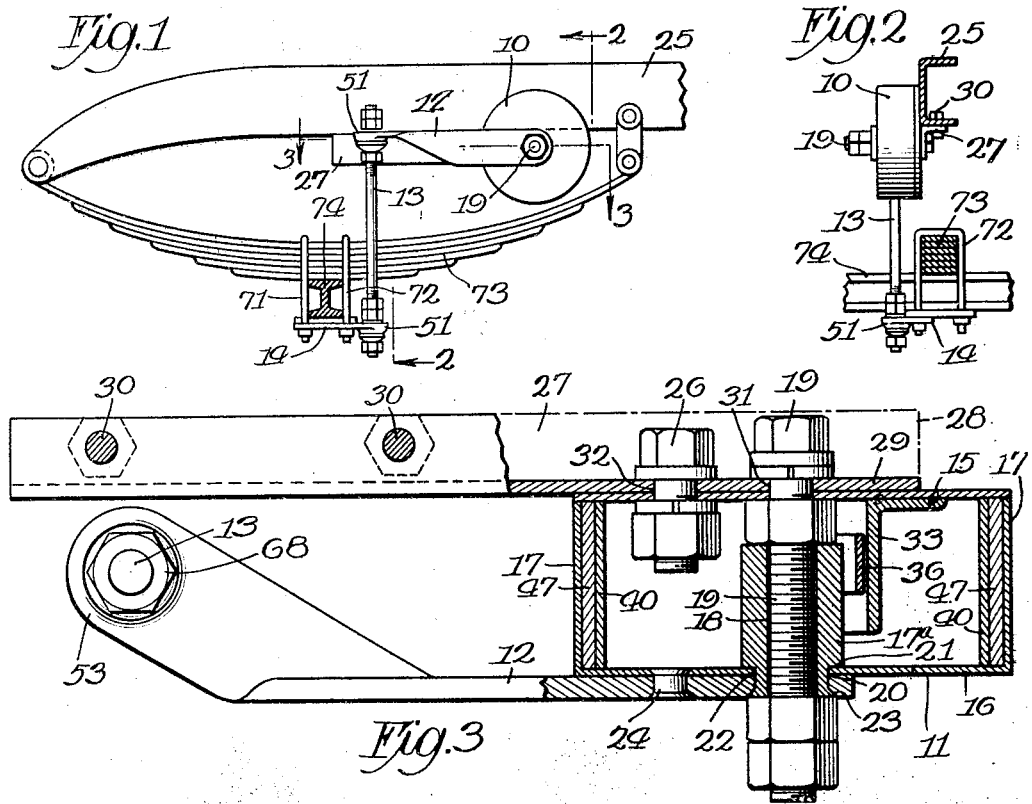
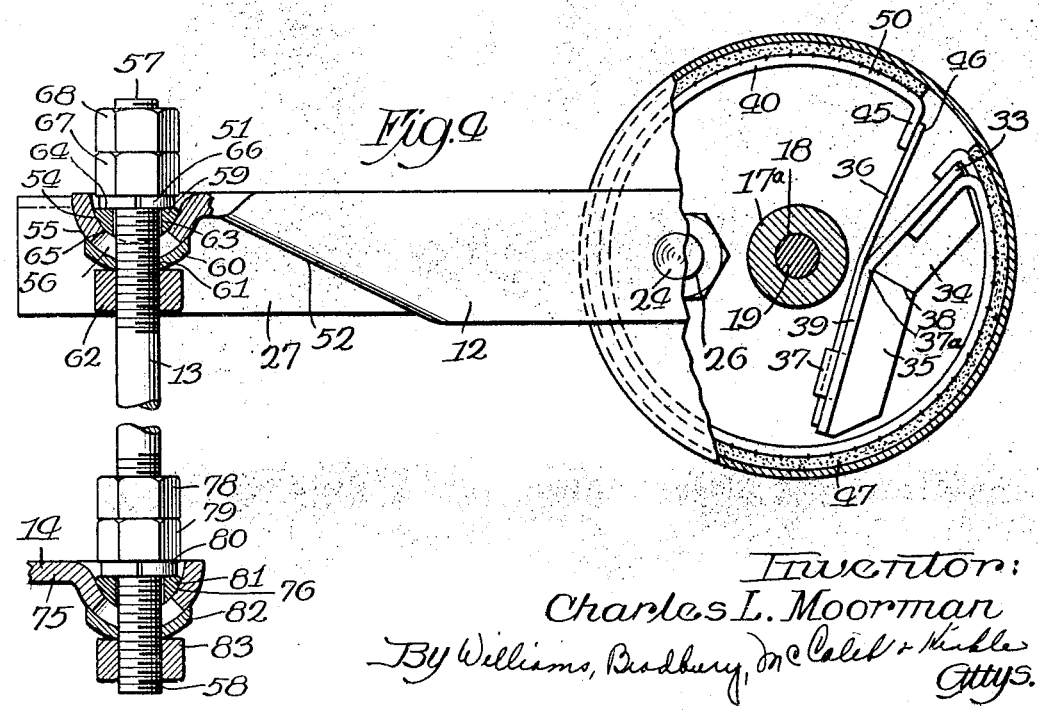
Inventor:
Charles L. Moorman
By Williams, Bradbury, McCaleb & Hinkle
Attys.

March 1, 1932.   C. L. MOORMAN   1,847,354
SHOCK ABSORBER
Filed April 20, 1928   2 Sheets-Sheet 2
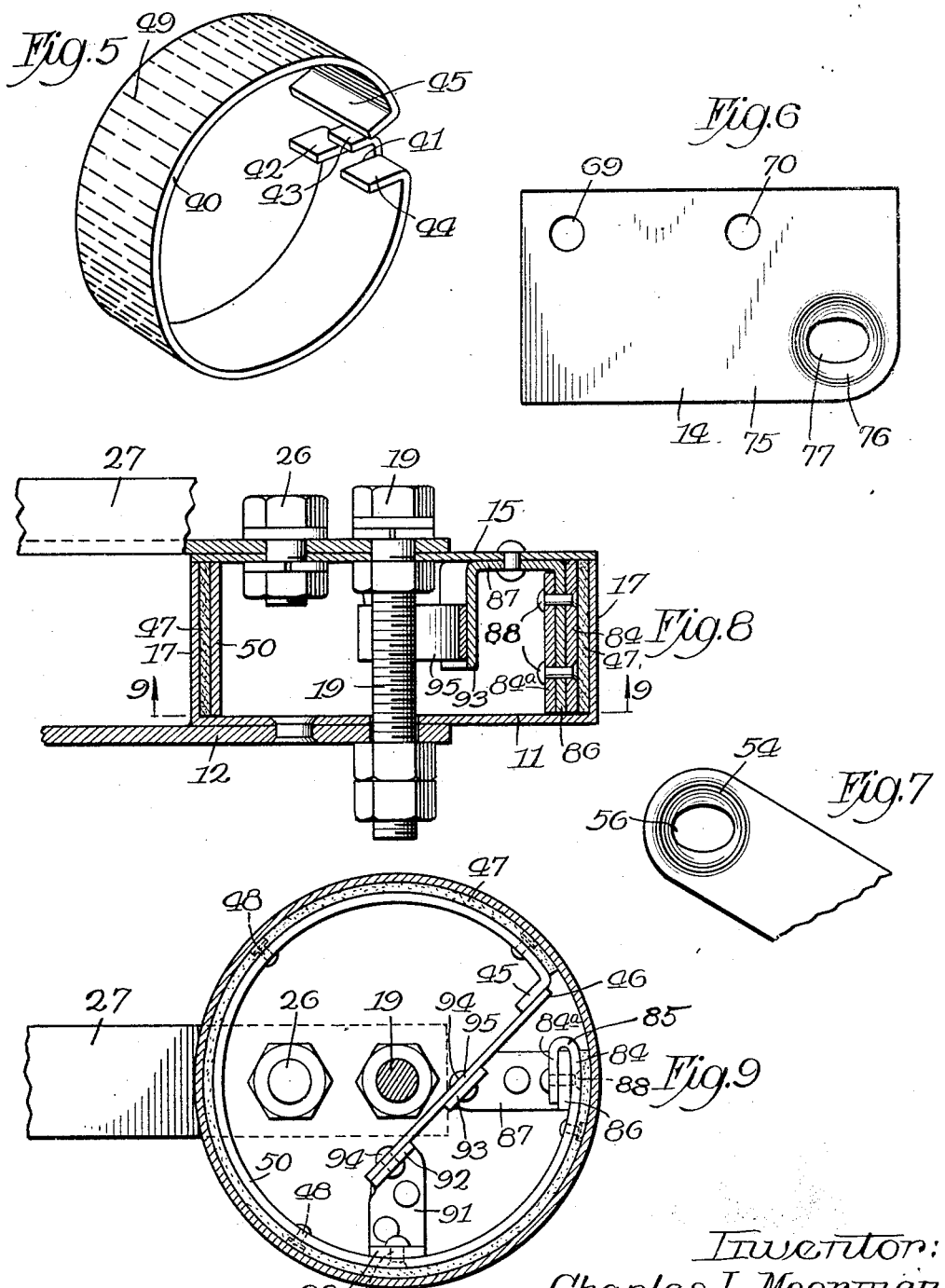
Inventor:
Charles L. Moorman
By Williams, Bradbury, McCaleb & Hinkle
Attys.

Patented Mar. 1, 1932

1,847,354

UNITED STATES PATENT OFFICE

CHARLES L. MOORMAN, OF CHICAGO, ILLINOIS

SHOCK ABSORBER

Application filed April 20, 1928. Serial No. 271,427.

The present invention relates to shock absorbers and is particularly concerned with shock absorbers adapted to be used upon automotive vehicles.

One of the objects of my invention is the provision of a simple and effective shock absorber, comprising a minimum of operative elements, which may be so economically manufactured and assembled, that it may be supplied at a relatively low cost, as compared with the complicated shock absorbers of the prior art.

Another object of my invention is the provision of a relatively simple yet effective shock absorber structure which is capable of exerting a relatively small snubbing or shock absorbing action in one direction, and a relatively large resistance in the opposite direction.

Another object of my invention is the elimination of many of the parts heretofore considered essential in a frictional shock absorber and accomplishment of the same functions by a lesser number of elements, thereby decreasing the cost of manufacture and providing a shock absorber, which may be more cheaply manufactured and the parts of which are quickly and easily replaced when worn away.

Another object of the present invention is the provision of a novel shock absorber assembly, in which the operating parts are completely enclosed in a casing which performs the additional function of providing a relatively wide frictional surface at an effective radius from the point of pivot of the usual operating arm.

Other objects and advantages of my invention will appear more fully from the following description and from the accompanying drawings, in which similar characters of reference indicate similar parts throughout the several views.

Referring to the drawings,

Fig. 1 is a side elevational view of my shock absorber showing the preferred method of attachment;

Fig. 2 is a cross-sectional elevational view of the same taken on the line 2—2 of Fig. 1;

Fig. 3 is a cross-sectional plan view taken on the line 3—3 of Fig. 1, showing the interior structure of the shock absorber;

Fig. 4 is an enlarged elevational view of the shock absorber as in Fig. 1, showing a medial cross-section of universal joint and having the cover of the casing broken away;

Fig. 5 is a view in perspective of the expansible brake band employed in Fig. 4;

Fig. 6 is a plan view of the attaching plate employed on the axle of the vehicle;

Fig. 7 is a plan view of the end of the operating arm;

Fig. 8 is a view similar to Fig. 3, of a modified form of construction; and

Fig. 9 is an elevational cross-sectional view on the line 9—9 of Fig. 8.

Referring to Fig. 1, 10 indicates in its entirety my shock absorber which consists of frictional elements supported and enclosed in a casing 11, an operating arm 12, a connecting rod 13 and an attaching plate 14.

The casing 11 consists of a supporting plate 15 of sheet metal and a cup-shaped member 16 having a substantially cylindrical wall 17. In the embodiment of Figs. 1 to 4, the cover 16 is provided with a hub 17a.

The hub 17a may consist of a metal member having a central bore 18 for receiving a bolt 19 and having its end turned down as at 20 to form a shoulder 21. The cover 16 may be provided with a centrally located aperture 22 adapted to receive the reduced end 20 and the operating arm 12 provided with a similar aperture. The hub cover and operating arm may then be secured together by swedging the outer end of the hub into engagement with the operating arm 12 as at 23, effectively riveting the operating arm and cover against the shoulder 21. In order to secure the operating arm 12 to the cover and prevent relative rotation, an auxiliary fastening means is provided in the form of a rivet 24 passing through the arm and cover and securing the same together.

The supporting plate 15 may be secured directly to the frame 25 of the vehicle by means of the bolts 19 and 26, but in order to provide for the convenient application to modern vehicles, I prefer to secure the plate 15 to an angle iron supporting arm 27 having two flanges 28 and 29 at right angles to each other. The angle iron 27 may be rigidly secured to the framework of the car by a plurality of bolts 30. The flange 29 of the angle iron 27 is provided with a pair of apertures 31 and 32, the aperture 31 serving to receive the bolt 19 passing through the angle iron 27, supporting plate 15, hub 17 and arm 12 to rotatably secure the casing upon the plate 15. The second aperture 32 may receive a bolt 26 or a rivet to secure the plate 15 to the angle iron 27 or to the frame of the vehicle as the case may be.

The supporting plate 15 is provided with a projecting shoulder or lug 33 in the form of a sheet metal plate having a pair of flanges 34 and 35 bent at substantially right angles and spot-welded to the plate 15. The plate 33 is also provided with means for securing a spring 36 comprising an ear 37 punched out of said plate and extending parallel thereto in position to clamp the spring 36 at one end.

In order that the plate 33 may both support the spring 36 and be spaced from the end of the spring 36, I bend the plate 33 as at 37a removing surplus material between the flanges 34 and 35 as at 38. Thus the flat spring 36 may be clamped upon the flat surface 39 of the plate 33 by the ear 37, the spring projecting from the plate 33 to a point adjacent the outer boundary of the plate 15. The outer edge of the plate 33 is also positioned adjacent the boundary of the supporting plate 15 for securing an expansible brake band 40 within the casing 11.

The brake band 40 comprises a substantially circular band of steel having one end split as at 41 and a plurality of flanges 42, 43 and 44 bent inward in substantially a radial direction. The central flange 43 is spaced from the flanges 42 and 44 a sufficient distance to receive the thickness of the plate 33 and the relative proportions of the parts are such that when the plate 33 is received between the flanges 43 and 42—44, the brake band 40 extends substantially concentric with the cylindrical surface 17 of the casing. The opposite end of the brake band 40 may be bent inward as at 45 for engagement with the end 46 of the spring 36, the spring engaging outside the end of the brake band.

Between the brake band 40 and the cylindrical surface 17 of the casing, I provide a brake lining 47 consisting of the usual woven fabric of heat resistive and wear resistive material known as thermoid and commonly employed for automobile brake lining. The brake lining may be riveted to the brake band as at 48 with the usual rivets countersunk into the lining, but is not necessarily secured to the brake band. In the embodiment of Figs. 1 to 4, the brake band 40 is provided with a plurality of transverse serrations 49 adapted to grip the brake lining and rotate the lining with the brake band.

The brake band being resilient, it is adapted to force the lining into engagement with the cylindrical surface 17, and this action is aided by the employment of the spring 36 which may be eliminated in some embodiments without affecting the operation of the device. When the plate 15 is rotated in a counter-clockwise direction relative to the cup 11, the brake lining slides against the cylindrical surface 17 producing a moderate degree of friction depending upon the expansive force of the resilient brake band. However, when the plate 15 is rotated in a clockwise direction relative to the cup 11, the brake band is pushed by the shoulder 33 on the plate 15 rather than pulled as in the previous case and the free end 50 of the brake band stubs the brake lining against the cylindrical surface 17 and produces a very high frictional resistance to the relative motion of these parts.

The actuating arm 12 comprises a relatively thick sheet metal member secured to the cover 11 as previously described and provided with a universal joint 51 securing the same to the connecting rod 13. At a point 52 intermediate its length the actuating arm 12 is bent along a diagonal line in such manner as to bring the end 53 over in line with substantially the middle of the cylindrical surface 17. The arm 12 being rigidly connected to the cup 11, this provides a point of connection for actuating the arm 12 which is balanced relative to the frictional surfaces of the shock absorber.

The end 53 of the actuating arm 12 is stamped with a depression 54 shaped substantially like a portion of a sphere, also forming a substantially spherical projection 55 on the opposite side. The depression 54 is provided with an aperture 56 which may be a substantially elliptical shape and of sufficient size to provide clearance for the connecting rod 13 in all directions. The aperture 56 is elongated in order to provide a greater range of universal movement in a plane perpendicular to the axis of rotation of the shock absorber casing 11.

The connecting rod 13 comprises a bolt preferably of steel and threaded at each end 57 and 58.

In order to provide a universal joint 51 the rod 13 is provided with a pair of collars 59 and 60 which are substantially complementary to the depression 54 and the projection 55 formed in the actuating arm 12. In other words, the collar 60 comprises a rounded sheet metal member having a central threaded bore 61 adapted to receive the bolt 13 and formed like a portion of a sphere having a radius substantially equal to the radius of curvature of the surface 55. The size of the collar 60 is such that it provides a substantial area of contact with the surface 55 at any position of the rod 13, and this collar may be conveniently formed by stamping the same out of sheet metal. After the collar 60 is threaded on the bolt 13, it may be firmly secured in place by engagement with an ordinary lock nut 62.

The collar 59 comprises a small steel ring having a central aperture 63 which provides a slight clearance upon the threaded end 57 of the rod 13. The collar 59 is formed with a flat outside surface 64 and a curved inner surface 65 formed like a portion of a sphere having a radius of curvature substantially equal to the radius of curvature of the surface 54. The rod 13 is also provided with a relatively heavy spring washer 66, a nut 67 and a lock nut 68.

The assembly of the foregoing parts will be obvious and the operation is as follows. The aperture 56 provides a clearance about the bolt 13 and the collars 59 and 60 provide spherical surfaces in contact with the cup 54—55 so that a universal joint having a limited range of movement is provided. The spring washer 66 maintains the collars 59 and 60 in close contact with the cup 54—55 and the frictional resistance of the universal joint may be varied by screwing down the nuts 67 and 68.

It will be observed, however, that all of the parts of my universal joint are formed of ordinary machine stock parts with the exception of the collar 60 which may be stamped from sheet steel and the collar 59 which may be stamped or turned out upon a lathe. My universal joint is therefore very economically manufactured and assembled as distinguished from the complicated structures of the prior art.

The attaching plate 14 comprises a substantially rectangular plate of sheet metal, preferably steel, having a pair of apertures 69 and 70 located at one side and adjacent one end and adapted to register with the ends of the U bolts 71 and 72 commonly employed for securing the leaf springs 73 to the axle 74, or to a rear axle housing (not shown). The location of the apertures 69 and 70 at one side of the plate 14 permits the opposite side 75 of the plate to project out beyond the leaf spring 73 so that the rod 13 will not interfere with the springs. The plate 14 is also provided with a stamped depression 76 similar to the depression 54 in the actuating arm 12 and having a similar aperture 77. The depression 76 and aperture 77 are located at the opposite corner from the apertures 69 and 70 so as to be clear of the axle 74 and spring 73.

The lower end 58 of the connecting rod 13 is likewise threaded and provided with a lock nut 78, nut 79, spring washer 80, internal universal collar 81, external universal collar 82 and lock nut 83. All of these parts are substantially identical in form with those described at the end 57 of the rod 13.

In the embodiment shown in Figs. 8 and 9, the device has been further simplified by the elimination of the hub 17a. In this embodiment, the angle iron 27, supporting plate 15, bolt 19, actuating arm 12, cover 11 and cylindrical surface 17 may be exactly as previously described. The brake band 50 is also substantially the same except that the fixed end 84 is bent back as at 85, about a flange 86 of a bracket 87 and firmly secured thereto by rivets 88. The brake band is also supported at a point 89 by being secured to a flange 90 of a second bracket 91, the point 89 being spaced substantially ninety degrees from the end 84 upon the plate 15.

The brackets 87 and 91 comprise sheet metal members having flanges 92 and 93 bent up at substantially right angles at their inner ends and the flanges 90 and 86 bent up at their outer ends to support the brake band 50. The brackets 87 and 91 may be secured to the plate 15 by riveting, spot-welding or any convenient fastening means. Secured to the flanges 92 and 93 by rivets 94 is a tempered metal spring 95 having its end 46 engaging the end 45 of the brake band 50. The spring 95 increases the resiliency of the already resilient expansible brake band 50 and insures a high degree of frictional engagement of the lining 47 with the surface 17.

In the present embodiment, the brake lining 47 is riveted to the brake band 50 as at 48, thereby eliminating the necessity for the serrated surface 49. The provision of a fixed support for a small arc of the brake band 50 gives sufficient fixed cylindrical surface to the brake band so that the cover 11 may rotate thereon without any guiding hub 17 upon the bolt 19. The bolt 19 rotatably secures the cover 11 and plate 15 together as in the previous embodiment.

The operation of my shock absorber is as follows. The plate 15 or angle iron 27 being directly secured to the frame 25 of the vehicle, this plate may be considered as fixed relative to the other shock absorber parts. The brake band 50 and lining 47 are also secured to the plate 15 while the cup 11, arm 12, connecting rod 13 and plate 14 are mechanically connected with the axle 74.

When the wheels of the vehicle strike an obstruction the wheels and axle will be given an impact upward, flexing the springs 73 and rotating the cup 11 in a clockwise direction upon the brake band 50. The universal joints 51 permit the necessary movement between the plate 14, connecting rod 13 and arm 12 and they may also substantially increase the frictional effect of the shock absorber at all times.

During this clockwise movement of the cover 11, the cylindrical surface 17 slides over the brake lining 47, this motion being resisted by a moderate degree of frictional force depending on the natural resiliency of the brake band 50 and the tension of the spring 36. The shock received by the spring 73 and transmitted in part to the frame 25 of the vehicle is thereby dampened and the vibration which ensues is reduce both in amplitude and speed.

Upon the rebound of the spring 73, the axle 74, connecting rod 13 and arm 12 will rotate the cover 11 in a counter-clockwise direction upon the plate 15, brake band 50 and lining 47. Since the end 45 of the brake band 50 is free and is also urged into engagement with the cylindrical surface 17 by the spring 36 and resiliency of the band 50, the frictional engagement of the lining 47 with the surface 17 will cause the brake band and lining to come into closer engagement with the surface 17 to snub the rebound. In other words, the lining is resiliently supported for engagement with the surface 17 in such manner that the frictional resistance between the lining and surface 17 tends to increase with an increase in the range of movement. The rebound of the spring is thus quickly checked and the vibrations quickly absorbed.

It will thus be observed that I have invented a shock absorber, most of the parts of which may be easily manufactured by stamping the same from sheet metal and my shock absorber may be quickly applied to the ordinary types of commercial automotive vehicles. My shock absorber comprises a minimum of moving parts and the parts subject to wear are quickly removed by the use of ordinary tools. The universal joints provided for connecting my shock absorber to the axle of the vehicle are of extremely simple design and capable of being cheaply manufactured and assembled, so that the cost of the complete device is greatly reduced.

I desire it to be understood that many of the advantages of my invention may be realized by using parts of the structure shown and by eliminating the brake lining and spring and making the brake band engage the casing without any lining, and my invention includes these simpler forms.

While I have illustrated and described specific embodiments of my invention, many modifications may be made without departing from the spirit of the invention and I do not wish to be limited to the precise details of construction set forth, but desire to avail myself of all changes within the scope of the appended claims.

Having thus described my invention, what I claim is new and wish to secure by Letters Patent of the United States, is:

1. In a shock absorber, the combination of a supporting member having a lug projecting from its inner face, with a curved resilient brake band, having a pair of inwardly directed shoulders for engagement on opposite sides of said lug, a cover member having a cylindrical surface for engaging said brake band, and means for rotatably securing said cover on said supporting member.

2. In a shock absorber, the combination of a supporting member having a lug projecting from its inner face, with a curved resilient brake band, having a pair of inwardly directed shoulders for engagement on opposite sides of said lug, a cover member having a cylindrical surface for engaging said brake band, means for rotatably securing said cover on said supporting member and a brake lining between said surface and brake band.

In witness whereof, I hereunto subscribe my name this 18th day of April, 1928.

CHARLES L. MOORMAN.